United States Patent
Monitzer

(10) Patent No.: US 7,225,356 B2
(45) Date of Patent: May 29, 2007

(54) SYSTEM FOR MANAGING OPERATIONAL FAILURE OCCURRENCES IN PROCESSING DEVICES

(75) Inventor: Arnold Monitzer, Wayne, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 462 days.

(21) Appl. No.: 10/773,543

(22) Filed: Feb. 6, 2004

(65) Prior Publication Data

US 2005/0138517 A1    Jun. 23, 2005

Related U.S. Application Data

(60) Provisional application No. 60/517,776, filed on Nov. 6, 2003.

(51) Int. Cl.
*G06F 11/00* (2006.01)

(52) U.S. Cl. .............. 714/12; 714/10; 714/11; 714/13

(58) Field of Classification Search .......... 714/10, 714/11, 12, 13
See application file for complete search history.

(56) References Cited

U.S. PATENT DOCUMENTS

| | | | | |
|---|---|---|---|---|
| 4,817,091 A | * | 3/1989 | Katzman et al. | 714/8 |
| 5,058,057 A | | 10/1991 | Morita et al. | |
| 5,295,258 A | * | 3/1994 | Jewett et al. | 714/12 |
| 5,574,849 A | * | 11/1996 | Sonnier et al. | 714/12 |
| 5,696,895 A | | 12/1997 | Hemphill et al. | |
| 5,964,886 A | * | 10/1999 | Slaughter et al. | 714/4 |
| 6,009,455 A | * | 12/1999 | Doyle | 709/201 |
| 6,067,545 A | * | 5/2000 | Wolff | 707/10 |
| 6,078,990 A | * | 6/2000 | Frazier | 711/114 |
| 6,094,416 A | | 7/2000 | Ying | |
| 6,145,089 A | | 11/2000 | Le et al. | |
| 6,189,111 B1 | * | 2/2001 | Alexander et al. | 714/8 |
| 6,192,483 B1 | | 2/2001 | Moiin et al. | 714/4 |
| 6,421,787 B1 | * | 7/2002 | Slaughter et al. | 714/4 |

(Continued)

FOREIGN PATENT DOCUMENTS

WO    WO 97/49039    12/1997

OTHER PUBLICATIONS

UK Search Report.

*Primary Examiner*—Scott Baderman
*Assistant Examiner*—Tim Bonura
(74) *Attorney, Agent, or Firm*—Alexander J. Burke

(57) ABSTRACT

A system automatically adaptively modifies a fail-over configuration priority list of back-up devices of a group (cluster) of processing devices to improve availability and reduce risks and costs associated with manual configuration. A system is used by individual processing devices of a group of networked processing devices, for managing operational failure occurrences in devices of the group. The system includes an interface processor for maintaining transition information identifying a second processing device for taking over execution of tasks of a first processing device in response to an operational failure of the first processing device and for updating the transition information in response to a change in transition information occurring in another processing device of the group. An operation detector detects an operational failure of the first processing device. Also, a failure controller initiates execution, by the second processing device, of tasks designated to be performed by the first processing device in response to detection of an operational failure of the first processing device.

20 Claims, 7 Drawing Sheets

U.S. PATENT DOCUMENTS

| | | | |
|---|---|---|---|
| 6,487,643 B1 * | 11/2002 | Khare et al. | 711/150 |
| 6,532,494 B1 | 3/2003 | Frank et al. | 709/224 |
| 6,609,214 B1 * | 8/2003 | Dahlen et al. | 714/5 |
| 6,636,982 B1 * | 10/2003 | Rowlands | 714/4 |
| 6,658,589 B1 * | 12/2003 | Taylor | 714/6 |
| 6,735,205 B1 * | 5/2004 | Mankude et al. | 370/395.32 |
| 6,785,678 B2 * | 8/2004 | Price | 707/8 |
| 6,993,566 B2 * | 1/2006 | Davis et al. | 709/213 |
| 7,058,846 B1 * | 6/2006 | Kelkar et al. | 714/4 |
| 2001/0056554 A1 | 12/2001 | Chrabaszcz | 714/13 |
| 2002/0073354 A1 | 6/2002 | Schroiff et al. | |
| 2003/0018927 A1 | 1/2003 | Gadir et al. | 714/4 |
| 2003/0051187 A1 | 3/2003 | Mashayekhi et al. | |

* cited by examiner

FIGURE 5

Backup priority list (all nodes)

| Protected node | Node 1 | Node 2 | Node 3 | Node 4 | Node 5 |
|---|---|---|---|---|---|
| Primary backup | Node 4 | Node 4 | Node 5 | Node 5 | Node4 |
| Secondary Backup | Node 5 | Node 5 | Node 4 | N | N |
| Node state | A | A | A | A | A |

FIGURE 6

Backup priority list (Node 4)

| Protected node | Node 1 | Node 2 | Node 3 | Node 4 | Node 5 |
|---|---|---|---|---|---|
| Primary backup | Node 4 | Node 4 | Node 5 | Node 5 | Node4 |
| Secondary Backup | Node 5 | Node 5 | Node 4 | N | N |
| Node state | A | A | A | N | A |

Backup priority list (All other nodes)

| Protected node | Node 1 | Node 2 | Node 3 | Node 4 | Node 5 |
|---|---|---|---|---|---|
| Primary backup | Node 4 | Node 4 | Node 5 | Node 5 | Node4 |
| Secondary Backup | Node 5 | Node 5 | Node 4 | N | N |
| Node state | A | A | A | A | A |

FIGURE 8

Backup priority list (all nodes)

| Protected node | Node 1 | Node 2 | Node 3 | Node 4 | Node 5 |
|---|---|---|---|---|---|
| Primary backup | N | N | Node 5 | Node 5 | N |
| Secondary Backup | Node 5 | Node 5 | N | N | N |
| Node state | A | A | A | N | A |

Backup priority list (all nodes)

| Protected node | Node 1 | Node 2 | Node 3 | Node 4 | Node 5 |
|---|---|---|---|---|---|
| Primary backup | N | N | N | N | N |
| Secondary Backup | N | N | N | N | N |
| Node state | N | A | A | N | N |

SYSTEM FOR MANAGING OPERATIONAL FAILURE OCCURRENCES IN PROCESSING DEVICES

This is a non-provisional application of provisional application Ser. No. 60/517,776 by A. Monitzer filed Nov. 6, 2003.

FIELD OF THE INVENTION

This invention concerns a system for managing operational failure occurrences in processing devices of a group of networked processing devices.

BACKGROUND OF THE INVENTION

Computing platforms are used in various industries (telecommunication, healthcare, finance, etc.) to provide high availability online network accessed services to customers. The operational time (uptime) of these services is important and affects customer acceptance, customer satisfaction, and ongoing customer relationships. Typically a service level agreements (SLA) which is a contract between a network service provider and a service customer, defines a guaranteed percentage of time the service is available (availability). The service is considered to be unavailable if the end-user is not able to perform defined functionality at a provided user interface. Existing computing network implementations employ failover cluster architectures that designate a back-up processing device to assume functions of a first processing device in the event of an operational failure of the first processing device in a cluster (group) of devices. Known failover cluster architectures typically employ a static list (protected peer nodes list) of processing devices (nodes of a network) designating back-up processing devices for assuming functions of processing devices that experience operational failure. A list is pre-configured to determine a priority of back-up nodes for individual active nodes in a cluster. In the event of a failure of an active node, a cluster typically attempts to fail over to a first available node with highest priority on the list.

One problem of such known systems is that multiple nodes may fail to the same back-up node causing further failure because of over-burdened computer resources. Further, for a multiple node cluster, existing methods require a substantial configuration effort to manually configure a back-up processing device. In the event that two active nodes fail in a multiple node cluster configured with the same available back-up node as highest priority in their failover list, both nodes failover to this same back-up node. This requires higher computer resource capacity for the back-up node and increases the cost of the failover configuration. In existing systems, this multiple node failure situation may possibly be prevented by user manual reconfiguration of failover configuration priority lists following a single node failure. However, such manual reconfiguration of an operational node cluster is not straightforward and involves a risk of causing failure of another active node leading to further service disruption. Further, in existing systems a node is typically dedicated as a master server and other nodes are slave servers. A cluster may be further separated into smaller cluster groups. Consequently, if a disk or memory shared by master and slave or separate groups in a cluster fails, the cluster may no longer be operational. Also, load balancing operations are commonly employed in existing systems to share operational burden in devices in a cluster and this comprises a dynamic and complex application that increases risk. A system according to invention principles provides a processing device failure management system addressing the identified problems and deficiencies.

SUMMARY OF THE INVENTION

A system automatically adaptively modifies a fail-over configuration priority list of back-up devices of a group (cluster) of processing devices based on factors including, for example, a current load state of the group, memory usage of devices in the group, and availability of passive back-up processing devices in the group to improve availability and reduce risks and costs associated with manual configuration. A system is used by individual processing devices of a group of networked processing devices, for managing operational failure occurrences in devices of the group. The system includes an interface processor for maintaining transition information identifying a second processing device for taking over execution of tasks of a first processing device in response to an operational failure of the first processing device and for updating the transition information in response to a change in transition information occurring in another processing device of the group. An operation detector detects an operational failure of the first processing device. Also, a failure controller initiates execution, by the second processing device, of tasks designated to be performed by the first processing device in response to detection of an operational failure of the first processing device.

BRIEF DESCRIPTION OF THE DRAWING

FIGS. 5-9 show prioritized lists illustrating automatic failure management of back-up processing devices assuming functions of processing devices in the event of device operational failure, according to invention principles.

DETAILED DESCRIPTION OF INVENTION

Figure 1:
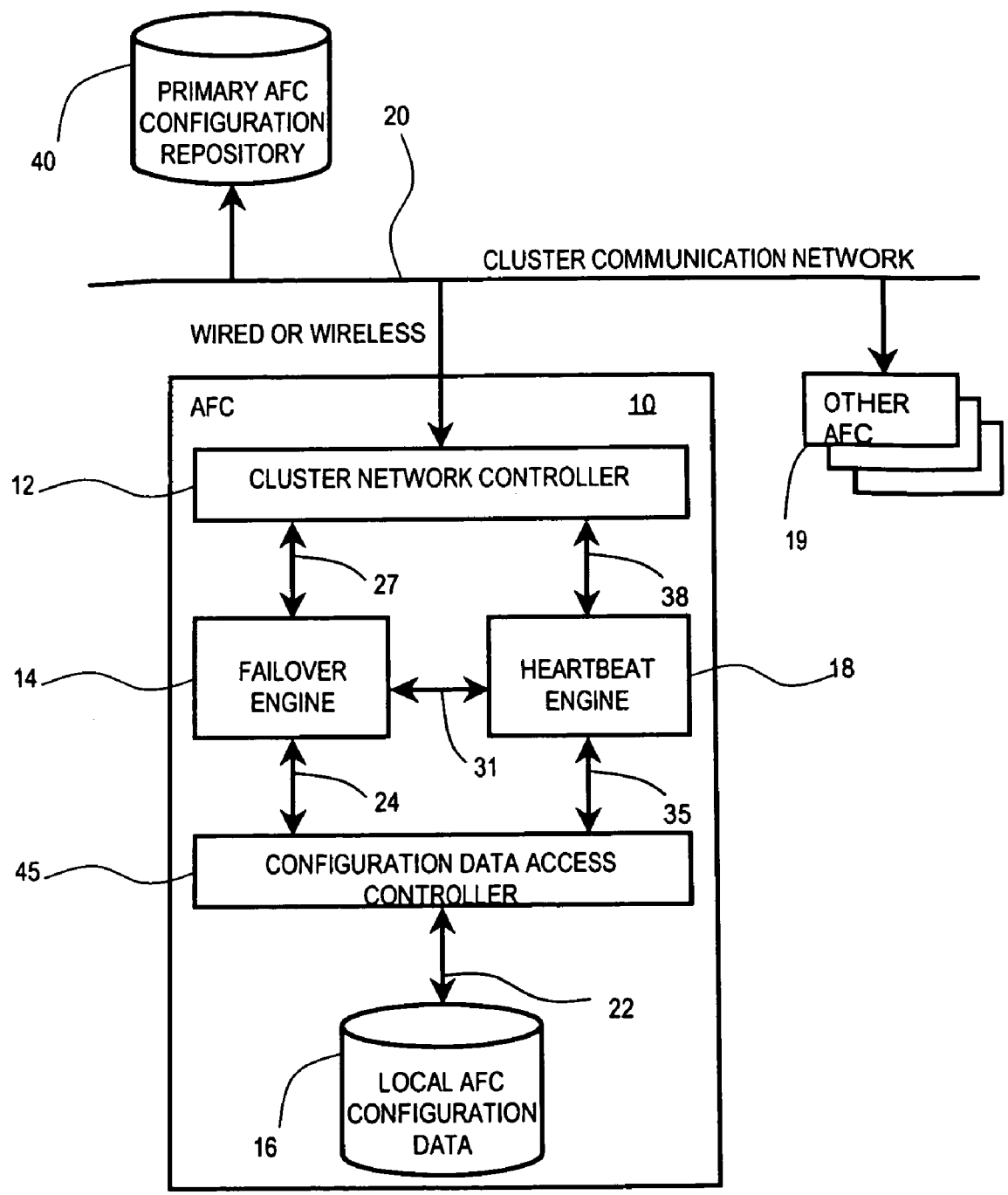
FIG. 1 shows a block diagram of a system used by a group of networked processing devices, for managing operational failure occurrences in devices of the group, according to invention principles.

FIG. 1 shows a block diagram of a system including automatic failover controller (AFC) 10 for managing operational failure occurrences in processing devices (nodes) of a group of networked processing devices (not shown) accessed via communication network 20. The system enables grouping (clustering) of multiple nodes and improves overall cluster availability. An individual node in a cluster in the system has a priority list identifying back-up nodes for each active node that is protected. The list contains a priority list of active nodes and may be termed a protected peer nodes list. In a known existing failure system implementation, a protected peer node list is static, therefore in case of a failure of one active node, a failure management system searches for a first available back-up node in the priority list independent of the current resource utilization of the backup node found. In contrast, the system of FIG. 1 automatically adapts and optimizes a protected peer nodes list for a current state of processing devices (nodes) in a cluster. The FIG. 1 system facilitates failure management of multiple nodes operating in a clustered configuration. A node is a single processing device or topological entity connected to other nodes via a communication network (e.g., network 20, a LAN, intra-net or Internet)). A processing device as used herein, includes a server, PC, PDA, notebook, laptop PC, mobile phone, set-top box, TV, or any other device providing functions in response to stored coded machine readable instruction. It is to be noted that, the terms node and processing device as well as the terms cluster and group are used interchangeably herein.

A cluster is a group of nodes that are connected to a cluster network and that share certain functions. Functions provided by a cluster are implemented in software or hardware. Individual nodes that participate in a cluster incorporate failure processing functions and provide failure management (fail-over) capability to back-up nodes. In the FIG. 1 system an individual node also provides the processor implemented function supporting cluster management including adding nodes to a cluster and removing nodes from the cluster. A processor as used herein is a device and/or set of machine-readable instructions for performing tasks. As used herein, a processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example.

The FIG. 1 system reconfigures a cluster configuration (and updates a back-up priority list) based on detection of a change of state (e.g., from available to unavailable) of a node in the cluster. This reconfiguration function is implemented, for example, using Failover Engine 14 which uses network controller 12 and network 20 to notify primary Automatic Failover Controller (AFC) configuration repository 40 and other AFC cluster processing devices 19 about state changes. Failover Engine 14 also responds to configuration changes and synchronization messages forwarded by the network controller 12 and responds to notifications communicated by heartbeat engine 18. In response to the received messages Failover Engine 14 initiates modification of a local failover configuration stored in repository 16 and communicates data indicating the modified configuration via network controller 12 and network 20 to primary configuration repository 40 and other AFC units 19.

The FIG. 1 system architecture provides a robust configuration capable of managing multiple failures of operational devices in a group. The system dynamically optimizes a configuration indicated in a predetermined processing device back-up list for a group including multiple processing devices. The system readily scales to accommodate an increase in number of nodes and reduces data traffic required between AFC 10 and other AFCs 19 in the event of multiple node failures. Further, upon the occurrence of two node failures in a group of nodes, both nodes do not failover to the same back-up node if different backup nodes are available as indicated by the priority lists. The system reduces or eliminates the need for manual intervention and extensive testing to ensure that, after a particular node assumes operation of tasks of a failed node of a group, other active nodes failover to a backup node different to the particular node. This also reduces risk associated with repair and manual reconfiguration and maintenance cost of a cluster configuration.

Individual nodes of a group include an adaptive failover controller (e.g., AFC 10) which includes various modules providing the functions and connections described below. Failover Engine 14 of AFC 10 controls and configures other modules of AFC 10 including Heartbeat Engine 18, Cluster Network Controller 12 as well as Local AFC Configuration Data repository 16 configured via Configuration Data Access Controller 45. Failover Engine 14 also initializes, maintains and updates a state machine used by AFC 10 and employs and maintains other relevant data including utilization parameters. These utilization parameters identify resources (e.g., processing devices, memory, CPU resources, IO resources) that are used for performing particular computer operation tasks and are used by Failover Engine 14 in managing processing device back-up priority lists. The utilization parameters are stored in the Local AFC Configuration Data repository 16. Failover Engine 14 advantageously uses state and utilization parameter information to optimize a protected peer nodes list for a group of processing devices (e.g., including a device incorporating AFC 10 and other devices individually containing an AFC such as other AFCs 19). Failover Engine 14 derives utilization parameter information from Local AFC Configuration Data repository 16 in a synchronized manner. Further, Engine 14 employs Cluster Network Controller 12 to update state and utilization parameter information for the processing devices in a group retained in Primary AFC Configuration Repository 40 and to update state and utilization parameter information retained in local AFC configuration data repositories of the other AFCs 19.

Failover Engine 14 communicates messages including data identifying updates of Local AFC Configuration Data repository 16 to Heartbeat Engine 18 via Failover-Heartbeat Interface 31. Heartbeat engine uses Configuration Data Access Controller 45 to read configuration information from Local AFC Configuration Data repository 16 via communication interface 22. Heartbeat Engine 18 also uses Cluster Network Controller 12 to establish a communication channel with Heartbeat Engines of other AFCs 19 using the configuration data acquired from repository 16. Configuration Data Access Controller 45 supports read and write access to repository 16 via interface 22 and supports data communication via interface 24 with Failover engine 14 and via interface 35 with Heartbeat Engine 18: For this purpose, Configuration Data Access Controller 45 employs a communication arbitration protocol that protects data from corruption during repository 16 data modification.

Cluster Network Controller 12 provides communication Interfaces 27 and 38 supporting access by Failover Engine 14 and Heartbeat Engine 18 respectively to network 20. Controller 12 provides bidirectional network connectivity services over Cluster Communication Network 20 and supports delivery of information from a connection source to a connection destination. Specifically, Controller 12 provides the following connectivity services over a dedicated network connection (or via a dynamically assigned connection via the Internet, for example) from AFC 10 to Other AFCs 19, or to Primary AFC Configuration Repository 40. Controller 12 supports bidirectional communication between AFC 10 and network controllers of other nodes, e.g., controllers of other AFCs 19, Cluster Network Controller 12 is Internet Protocol (IP) compatible, but may also employ other protocols including a protocol compatible with Open Systems Interconnect (OSI) standard, e.g. X.25 or compatible with an intra-net standard. In addition, Cluster Network Controller 12 advantageously provides network wide synchronization and a data content auto-discovery mechanism to enable automatic identification and update of priority back-up list and other information in repositories of processing devices in a cluster. Primary AFC Configuration Repository 40 is a central repository that provides non-volatile data storage for processing devices networked via Communication Network 20.

Figure 2:
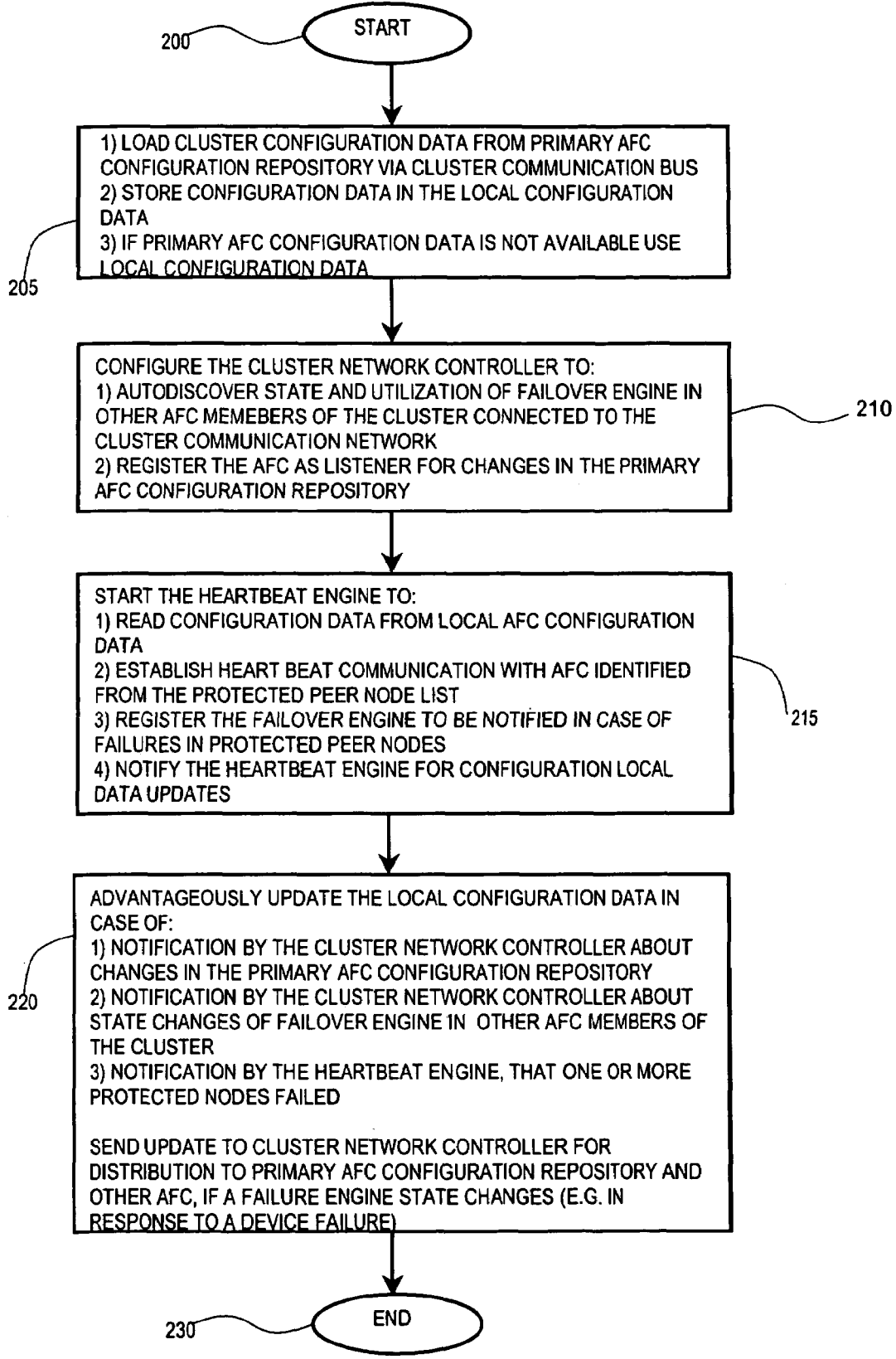
FIG. 2 shows a flowchart of a process used by the system of FIG. 1 for managing operational failure occurrences in devices of a group of networked processing devices, according to invention principles.

FIG. 2 shows a flowchart of a process used by AFC 10 of FIG. 1 for managing operational failure occurrences in devices of a group of networked processing devices. After the Start at step 200 Failover Engine 14 of AFC 10 initializes and commands Cluster Network Controller 12 to connect to Cluster Communication Network 20. In response to Cluster Network 20 being accessible, Failover Engine 14 acquires available configuration information from Primary AFC Configuration Repository 40 in step 205. Failover Engine 14 stores the acquired configuration information in Local AFC Configuration Data repository 16. If Primary AFC Configuration Repository 40 is not accessible, Failure Engine 14 uses configuration information derived from Local AFC Configuration Data repository 16 for the subsequent steps of the process of FIG. 2.

In step 210, Failover Engine 14 configures an auto-discovery function of network controller 12 to automatically detect state and utilization information of other AFCs 19 in processing devices comprising the cluster associated with AFC 10 that is connected via Cluster Communication Network 20. Failover Engine 14 also registers as a listener for acquiring information, identifying changes in device state and utilization parameter information for the processing devices in a group, from Primary AFC Configuration Repository 40. After set-up of Cluster Network Controller 12 in step 210, Failover Engine 14 initiates operation of Heartbeat Engine 18 in step 215. Heartbeat Engine 18 acquires configuration information including a protected peer nodes list from Local AFC Configuration Data repository 16 and uses Cluster Network Controller 12 to establish heart beat communication between the AFC 10 and other AFCs 19. Specifically, Heartbeat Engine 18 uses Cluster Network Controller 12 to establish heart beat communication between the AFC 10 and other AFCs 19.that indicate AFC 10 as a back-up node in the individual protected peer nodes lists of other AFCs 19. Heart beat communication comprises a periodic exchange of information to verify that an individual peer node is still operational. Failover Engine 14 also registers with other AFCs 19 and Primary AFC Configuration Repository 40 to be notified in the event of a failure in a node identified in the protected peer node list of AFC 10. The FIG. 1 system advantageously uses cluster-wide configuration, synchronization and discovery in step 215 to notify Heartbeat Engine 18 of state changes and updates to Local AFC Configuration Data repositories 16 of other AFCs 19. Heartbeat Engine 18 also optimizes the fail over strategy for nodes in the associated cluster of processing devices.

In step 220, Failover Engine 14 advantageously updates Local AFC Configuration Data repository 16 with acquired processing device state and utilization parameter information and uses Cluster Network Controller 12 to synchronize these updates with updates to Primary AFC Configuration Repository 40 and other AFCs 19. Specifically, cluster Network Controller 12 notifies Failover Engine 14 about auto-discovered updates to Primary AFC Configuration Repository 40 and other AFCs 19 and Failover Engine 14 updates Local repository 16 with this acquired information. Similarly, heartbeat Engine 18 notifies Failover Engine 14 of changes in availability of protected peer nodes and Failover Engine 14 updates Local repository 16 with this acquired information. Failover Engine 14 correlates acquired information and notifications and optimizes cluster wide the protected peer nodes list stored in the Local AFC Configuration Data 16. The process of FIG. 2 terminates at step 230.

Load balancing operations are commonly employed in existing systems to share operational burden in devices in a cluster. For this purpose, measured CPU (Central Processing Unit) usage and total number of IOPS (Interface Operations Per Second) are used (individually or in combination) to balance load from a heavily utilized server to another machine, for example. Further, a cluster of processing devices in existing systems typically operate in a configuration where nodes are active and incoming load requests to the cluster are distributed and balanced across available servers in the cluster. A master server controls distribution and balancing of load across the servers. Load distributed to active nodes is measured and reported to the master node.

In contrast, the architecture of AFC 10 is used as an Active/Passive configuration where several active nodes receive an inbound load and share passive fail-over nodes (without active node load balancing). Load balancing is a complex application that adds additional risk and reduces device availability. Requests are forwarded from client devices to a virtual IP address that can be moved from one physical port to another physical port via communication network 20. In contrast to known systems, a dedicated master unit does not control a cluster and decisions are based on a distributed priority list of backup nodes. Therefore, failover management in AFC 10 is based on a prioritized back-up device priority list. In another embodiment, the architecture of AFC 10 employs active load balancing using parameters such as CPU load utilization, memory utilization and total number of IOPS, for example, to balance the load across active servers in a cluster.

Figure 3:
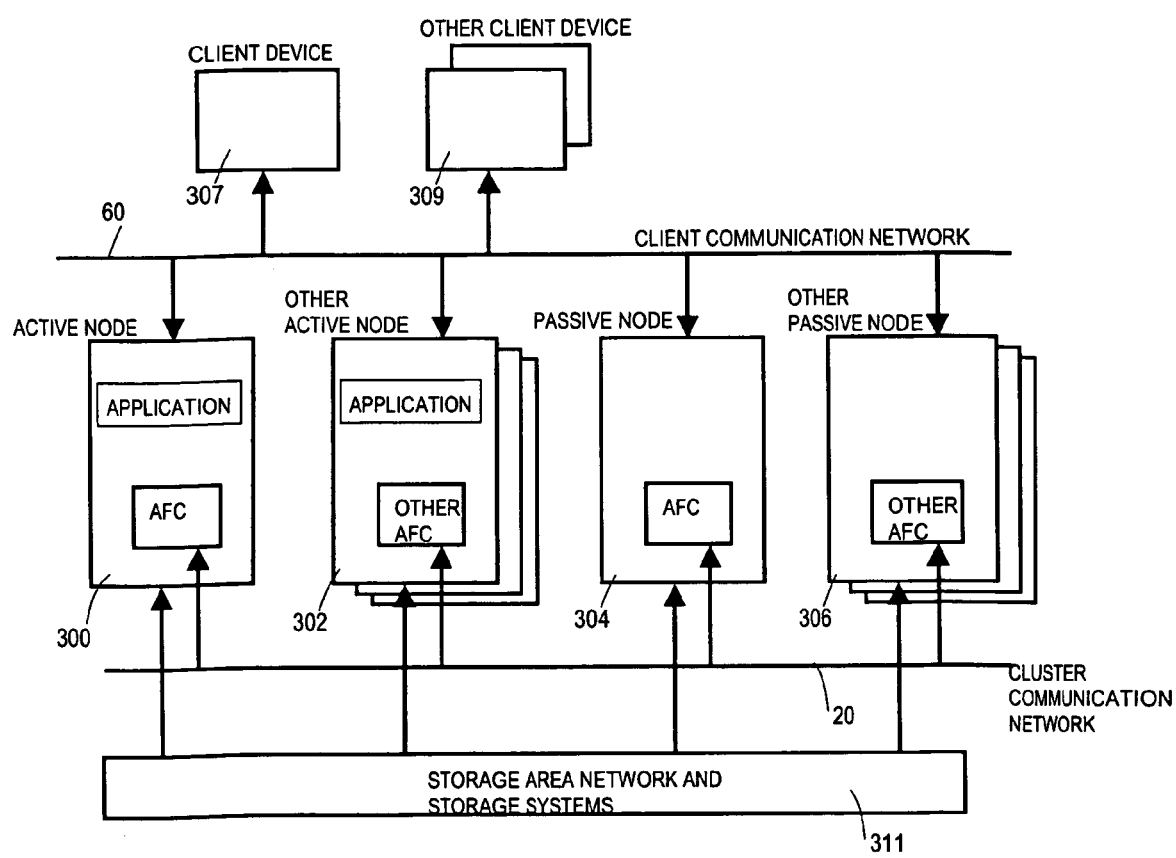
FIG. 3 shows a network diagram of a group of networked processing devices managed by the system of FIG. 1, according to invention principles.

FIG. 3 shows a network diagram of a group of networked processing devices managed by the system of FIG. 1. Specifically, FIG. 3 comprises a network diagram of an active-passive cluster. Active nodes 300 and 302 and passive nodes 304 and 306 are connected to client communication network 60 to provide services to processing devices 307 and 309 connected to this network and for cluster internal communication. Nodes 300-306 are also connected to storage systems and an associated storage area network 311 to provide shared drives used by the cluster. Further, nodes may have identical software installed (operating system, application programs etc.). Active nodes (300, 302) have one or more virtual IP addresses associated with a physical port connected to client communication network 60. Passive nodes (304, 306) do not have a virtual IP address associated with their physical port to client communication network 60. Client devices (307, 309) communicate message requests and data to a virtual IP address that is associated with one of the active nodes 300 and 302. In the event of fail-over (a failure of one or more of nodes 300-302, for example) a passive node (e.g., node 304 or 306) takes ownership of the virtual IP address of the active node and assigns it to its own physical port. Virtual resources fail-over to a back-up resource. In response to assignment of a virtual IP address, a passive node becomes active and changes to the group of active nodes.

In the event of a fail-over, those operations or transactions being performed by the processing device that fails are lost.

Figure 4:
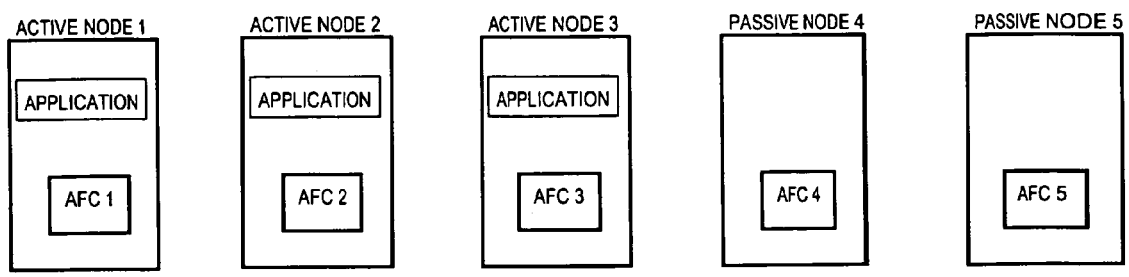
FIG. 4 shows an exemplary configuration of a group of networked processing devices managed by the system of FIG. 1, according to invention principles.

The operations and transactions recorded in an operations log as being performed or to be performed by the failed device are executed (or re-executed) by the back-up device that assumes the operations of the failed device. FIG. 4 shows an exemplary configuration of a group of networked processing devices managed by the system of FIG. 1. Specifically, the FIG. 4 configuration shows three active nodes (nodes 1, 2 and 3) and two backup nodes (nodes 4 and 5.) but this configuration may readily be extended to more backup nodes. Either back-up node 4 or back-up node 5 may act as a primary or secondary back-up node to individual active nodes 1,2 and 3. Active nodes 1, 2 and 3 execute copies of the same application programs and the respective virtual IP addresses of these nodes are assigned to their corresponding node physical ports. Passive nodes 4 and 5 are in standby mode and have no virtual IP addresses assigned to their respective physical ports.

FIGS. 5-9 show prioritized lists illustrating automatic failure management of the back-up processing devices that assume functions of processing devices of the FIG. 4 configuration in the event of device operational failure. The backup priority list of FIG. 5 is stored in each AFC (AFCs 1-5 of FIG. 4). FIG. 5 indicates primary backup node 4 monitors a protected node using a heartbeat engine (e.g., unit 18 FIG. 1). Specifically, back-up node 4 is the primary backup node for node 1, node 2, and node 5. If one of the monitored nodes 1, 2 or 5 fails, node 4 takes ownership of the particular virtual IP address and virtual server of the failed node and changes to an unavailable state. In the back-up list of FIG. 5, node state: A=Available, N=Not available.

In exemplary operation, passive node 4 experiences an operational problem. Specifically, a reduction in memory capacity that reduces its capability to assume operational load in the event of node 4 being required to assume tasks being performed by a failure of one of nodes 1, 2 or 5, for example. Subsequently,-active node 1 fails before the problem on node 4 is fixed.

In an existing known (non-load balancing) system, nodes 1 may disadvantageously repetitively and unsuccessfully attempt to fail-over to node 4 which is indicated as being in the Available state by the list of FIG. 5. This causes substantial operational interruption. In contrast, in the system of FIG. 1 node 4 detects its own reduction in memory capacity and updates its node state entry in its back-up priority list as indicated in FIG. 6. Specifically, the back-up node list stored in node 4 (shown in FIG. 6) illustrates the node state entry for node 4 (item 600) has become Not available. However, initially the back-up node lists of other nodes 1-3 and 5, illustrated in FIG. 7, have not received the information updating the availability status of node 4.

Other nodes 1-3 and 5 acquire updated node 4 availability information from the AFC unit of node 4 using an auto-discovery method. The AGCs of nodes 1-3 and 5 employ a network controller 12 (FIG. 1) in interrogating back-up list information of other nodes in the cluster connected to network 20. In another embodiment, the AFC unit of node 4 detects the back-up list information change and communicates the updated information via network 20 to nodes 1-3 and 5 and primary AFC repository 40. In acquiring and distributing updated back-up list information, network controller 12 employs communication and routing protocols for communicating node 4 back-up list availability information to nodes 1-3 and 5. For this purpose, network controller 12 employs IP compatible communication protocols including OSPF (Open Shortest Path First) routing protocol and protocols compatible with IETF (Internet Engineering Task Force): RFC1131, RFC1247, RFC1583, RFC1584, RFC2178, RFC2328 and RFC2370, for example, to distribute data representing state information of node 4 to nodes 1-3 and 5 and primary AFC repository 40. The RFC (Request For Comment) documents are available via the Internet and are prepared by Internet standards working groups.

FIG. 8 shows back-up priority lists of nodes 1-5 following processing of the received data representing state information of node 4 by respective AFCs of nodes 1-5 and the update of their respective back-up priority lists in local repositories (such as repository 16). The back-up priority lists of nodes 1-5 show that wherever node 4 was designated as a primary or secondary back-up node (items 800-808 in FIG. 8), it is now marked as Not available in response to the state change update. FIG. 8 shows node 4 is illustrated in FIG. 8 as being Not available in the 5 columns corresponding to the back-up arrangements of the 5 nodes of the system of FIG. 4. Consequently, now node 5 is the primary backup for node 1 (primary not available: secondary becomes primary), node 2 (primary not available: secondary becomes primary), and node 3.

Node 5 detects the failure in node 1 (using a heartbeat engine such as unit 18 of FIG. 1), validates the detected failure has occurred, takes over the tasks to be executed by node 1 and updates its back-up list record in its local repository. Network controller 12 in node 5 communicates data representing the change in state of node 5 (identifying a change to Not available state) to nodes 14 in a manner as previously described. The state change information is communicated to nodes 14 to ensure consistent back-up list information using the routing and communication protocols previously described. This makes sure that the information is consistently updated in nodes 1-5. FIG. 9 shows back-up priority lists of nodes 1-5 following processing of received data representing state information of node S by respective AFCs of nodes 1-5 and update of their respective back-up priority lists in local repositories (e.g., repository 16). The system failover strategy employs cluster parameters (e.g. state and resource utilization information) in determining available back-up nodes. This advantageously reduces downtime during a fail-over condition and reduces manual system reconfiguration.

In an alternative embodiment, back-up priority list information is communicated by individual nodes to primary AFC repository 40 and individual nodes 1-5 acquire back-up node list information from repository 40. An individual node of nodes 1-5 store back-up list information in repository 40 in response to detection of a state change or change in back-up list information stored in the individual node local repository (e.g., repository 16). An update made to back-up list information stored in repository 40 is communicated by repository system 40 to nodes 1-5 in response to detection of a change in stored back-up list information in repository 40. In another embodiment, individual nodes of nodes 1-5 intermittently interrogate repository 40 to acquire updated back-up list information.

Figure 10:
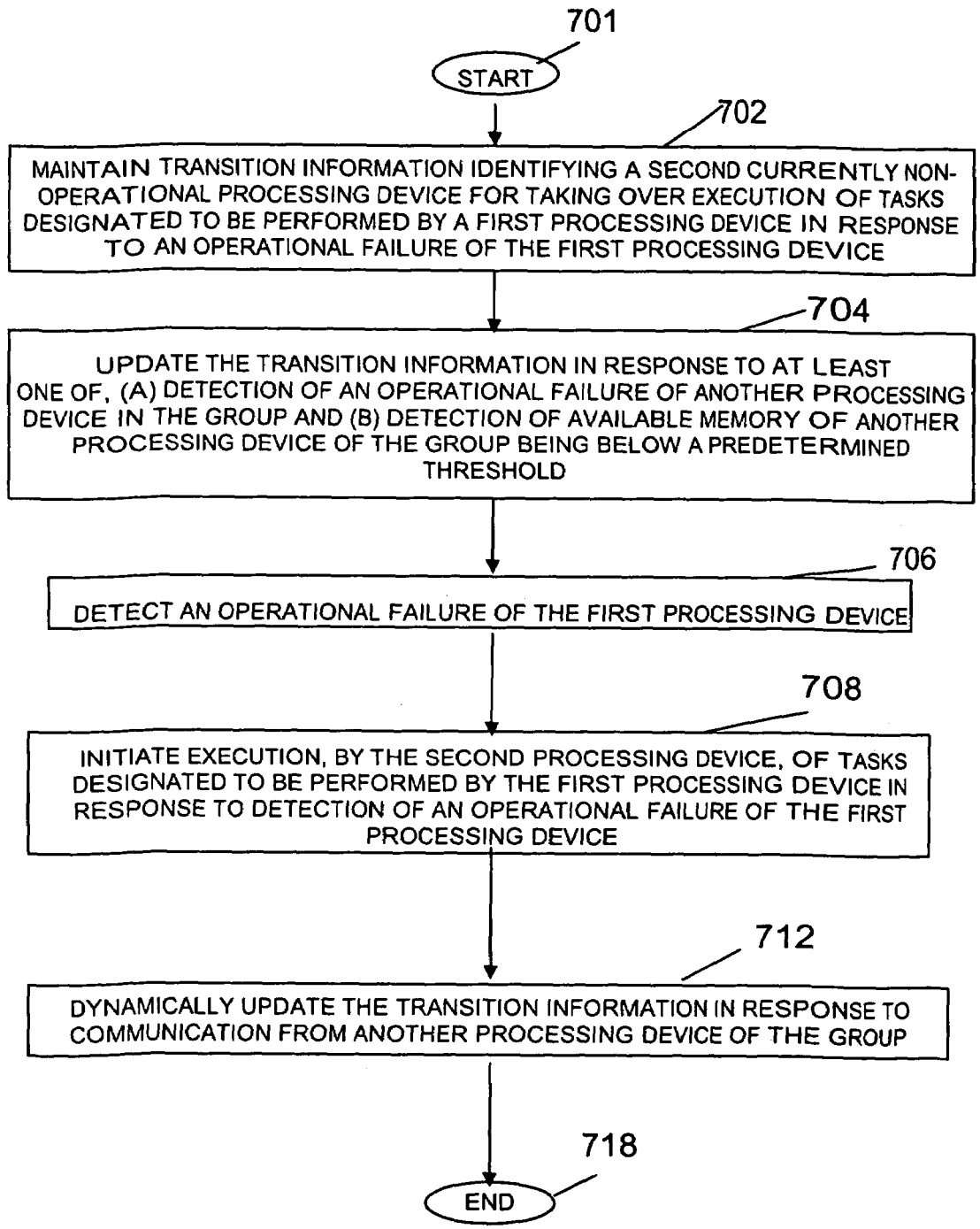
FIG. 10 shows a flowchart of a process used by AFC 10 of the system of FIG. 1 for managing operational failure occurrences in devices of a group of networked processing devices, according to invention principles.

FIG. 10 shows a flowchart of a process used by AFC 10 of the system of FIG. 1 for managing operational failure occurrences in devices of a group (cluster) of networked processing devices employing similar executable software. In step 702, after the start at step 701, AFC 10 maintains transition information in an internal repository identifying a second currently non-operational passive processing device for taking over execution of tasks designated to be performed by a first processing device, in response to an operational failure of the first processing device. An operational failure of a processing device comprises, a software execution failure or a hardware failure, for example. The transition information comprises a prioritized back-up list of processing devices for assuming execution of tasks of a first processing device in response to an operational failure of the first processing device. In step 704, AFC 10 updates the transition information in response to, (a) detection of an operational failure of another processing device in the group or (b) detection of available memory of another processing device of the group being below a predetermined threshold. AFC 10 in step 706 detects an operational failure of the first processing device. In step 708 AFC 10 initiates execution, by the second processing device, of tasks designated to be preformed by the first processing device in response to detection of an operational failure of the first processing device.

AFC 10 dynamically updates internally stored back-up device priority list information in step 712 in response to communication from another processing device of the group in order to maintain consistent transition information in the individual processing devices of the group. Specifically, the internally stored prioritized list is dynamically updated in response to factors including, detection of an operational failure of another processing device in the group or detection of available memory of another processing device of the group being below a predetermined threshold. The factors also include, (a) detection of operational load of another processing device in the group exceeding a predetermined threshold, (b) detection of use of CPU (Central Processing Unit) resources of another processing device of the group exceeding a predetermined threshold or (c) detection of a number of I/O (input-output) operations, in a predetermined time period, of another processing device of the group exceeding a predetermined threshold. The prioritized list is also dynamically updated in response to state information provided by a different processing device of the group indicating, a detected change of state of another processing device of the group from available to unavailable or a detected change of state of another processing device of the group from unavailable to available. For this purpose, AFC 10 interrogates other processing devices of the group to identify a change in transition information occurring in another processing device of the group. The process of FIG. 10 terminates at step 718.

The system of FIG. 1 advantageously adapts cluster fail-over back-up list configuration based on parameters (e.g. failover state, resource utilization) of nodes participating in the cluster. The system further optimizes a back-up node list based on the parameters and adapts heart beat operation based on the updated back-up nodes list. The system provides cluster-wide automatic synchronization of parameters maintained in nodes 1-5 using auto-discovery functions to detect changes in back-up list information stored in local repositories of nodes 1-5.

The systems and processes presented in FIGS. 1-10 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system according to invention principles provides high availability application and operating system software. Further, any of the functions provided by system 10 (FIG. 1) may be implemented in hardware, software or a combination of both and may reside on one or more processing devices located at any location of a network linking the FIG. 1 elements or another linked network including another intra-net or the Internet.

What is claimed is:

1. A system for use by individual processing devices of a group of networked processing devices, for managing operational failure occurrences in devices of said group, comprising:

an interface processor for maintaining transition information identifying a second processing device for taking over execution of tasks of a first processing device in response to an operational failure of said first processing device and for dynamically updating said transition information in response to a change in utilization parameters occurring in another processing device of said group;

an operation detector for detecting an operational failure of said first processing device; and a failure controller for initiating execution, by said second processing device, of tasks designated to be performed by said first processing device in response to detection of an operational failure of said first processing device.

2. A system according to claim 1, wherein said utilization parameters identify utilization of resources including at least one of, (a) memory, (b) CPU and (c) input-output communication, used for performing particular computer operation tasks in normal operation, each individual processing device of said group of networked processing devices incorporates a repository storing transition information, and said individual processing devices are in communication to maintain consistent transition information in said individual processing devices.

3. A system according to claim 1, wherein said transition information comprises a prioritized list of processing devices for assuming execution of tasks of a first processing device in response to an operational failure of said first processing device and said prioritized list is dynamically updated in response to communication from another processing device of said group.

4. A system according to claim 3, wherein said prioritized list indicates passive non-operational processing devices for assuming execution of tasks of a first processing device in response to an operational failure of said first processing device.

5. A system according to claim 3, wherein said prioritized list is dynamically updated in response to a plurality of factors including at least one of, (a) detection of an operational failure of another processing device in said group and (b) detection of available memory of another processing device of said group being below a predetermined threshold.

6. A system according to claim 3, wherein said prioritized list is dynamically updated to include state information indicating at least one of, (a) a detected change of state of another processing device of said group from available to unavailable and (b) a detected change of state of another processing device of said group from unavailable to available.

7. A system according to claim 6, including said interface processor determines a state of a processing device of said group from state information provided by a different processing device of said group.

8. A system according to claim 1, including
said interface processor interrogates other processing devices of said group to identify a change in transition information occurring in another processing device of said group.

9. A system according to claim 1, wherein
an operational failure of a processing device comprises at least one of, (a) a software execution failure and (b) a hardware failure.

10. A system according to claim 1, wherein
a processing device comprises at least one of, (a) server, (b) a computer, (c) a PC, (d) a PDA, (e) a telephone, (f) a processing device communicating via wireless communication, (g) a television, (h) a set top box and (i) a networking device, including executable software.

11. A system according to claim 1, wherein
an individual processing device of said group incorporates similar software to other processing devices of said group.

12. A system according to claim 1, wherein
said group comprises a cluster and a processing device comprises a node.

13. A system for use by individual processing devices of a group of networked processing devices, for managing operational failure occurrences in devices of said group, comprising:
an interface processor for maintaining transition information identifying a second processing device for taking over execution of tasks of a first processing device in response to an operational failure of said first processing device and for updating said transition information in response to a change in transition information occurring in another processing device of said group;
an operation detector for detecting an operational failure of said first processing device; and
a failure controller for initiating execution, by said second processing device, of tasks designated to be performed by said first processing device in response to detection of an operational failure of said first processing device wherein
said prioritized list is dynamically updated in response to a plurality of factors including at least one of, (a) detection of an operational failure of another processing device in said group, (b) detection of available memory of another processing device of said group being below a predetermined threshold, and at least one of, (c) detection of operational load of another processing device in said group exceeding a predetermined threshold, (d) detection of use of CPU (Central Processing unit) resources of another processing device of said group exceeding a predetermined threshold and (e) detection of a number of I/O (input output) operations, in a predetermined time period, of another processing device of said group exceeding a predetermined threshold.

14. A method for use by individual processing devices of a group of networked processing devices, for managing operational failure occurrences in devices of said group, comprising the activities of:
maintaining transition information identifying a second processing device for taking over execution of tasks of a first processing device in response to an operational failure of said first processing device and for updating said transition information in response to a change in utilization parameters identifying utilization of resources in another processing device of said group including of at least one of, (a) memory, (b) CPU and (c) input-output communication, used for performing particular computer operation tasks in normal operation;
detecting an operational failure of said first processing device; and
initiating execution, by said second processing device, of tasks designated to be performed by said first processing device in response to detection of an operational failure of said first processing device.

15. A method for use by individual processing devices of a group of networked processing devices, for managing operational failure occurrences in devices of said group, comprising the activities of:
storing transition information identifying a second processing device for taking over execution of tasks designated to be performed by a first processing device in response to an operational failure of said first processing device;
maintaining and updating said transition information indicating a change in utilization parameters identifying utilization of resources including of at least one of, (a) memory, (b) CPU (c) input-output communication and (d) processing, devices, used for performing particular computer operation tasks in normal operation, in another processing device of said group;
detecting an operational failure of said first processing device; and
initiating execution, by said second processing device, of tasks designated to be performed by said first processing device in response to detection of an operational failure of said first processing device.

16. A method for use by individual processing devices of a group of networked processing devices, for managing operational failure occurrences in devices of said group, comprising the activities of:
maintaining transition information indicating a change in utilization parameters identifying a second currently non-operational processing device for taking over execution of tasks designated to be performed by a first processing device in response to an operational failure of said first processing device;
updating said transition information in response to a change in utilization parameters of another processing device in said group and at least one of, (a) detection of an operational failure of another processing device in said group and (b) detection of available memory of another processing device of said group being below a predetermined threshold;
detecting an operational failure of said first processing device; and
initiating execution, by said second processing device, of tasks designated to be performed by said first processing device in response to detection of an operational failure of said first processing device.

17. A system for use by individual processing devices of a group of networked processing devices, for managing operational failure occurrences in devices of said group, comprising:
an individual processing device including,
a repository including transition information identifying a second processing device for taking over execution of tasks designated to be performed by a first processing device in response to an operational failure of said first processing device;

an interface processor for maintaining and updating said transition information in response to a change in utilization parameters occurring in another processing device of said group;

an operation detector for detecting an operational failure of said first processing device; and a failure controller for initiating execution, by said second processing device, of tasks designated to be performed by said first processing device in response to detection of an operational failure of said first processing device.

18. A system according to claim 17, wherein said interface processor communicates with other processing devices of said group to maintain consistent transition information in said individual processing device transition information repositories.

19. A system for use by individual processing devices of a group of networked processing devices, for managing operational failure occurrences in devices of said group, comprising:

an individual processing device including, a repository including transition information identifying a second currently non-operational processing device for taking over execution of tasks designated to be performed by a first processing device in response to an operational failure of said first processing device;

an interface processor for maintaining and updating said transition information in response to a change in utilization parameters of another processing device in said group and at least one of, (a) detection of an operational failure of another processing device in said group and (b) detection of available memory of another processing device of said group being below a predetermined threshold;

an operation detector for detecting an operational failure of said first processing device; and a failure controller for initiating execution, by said second processing device, of tasks designated to be performed by said first processing device in response to detection of an operational failure of said first processing device.

20. A system according to claim 19, wherein said transition information comprises a prioritized list of processing devices for assuming execution of tasks designated to be performed by said first processing device in response to an operational failure of said first processing device and said prioritized list is dynamically updated in response to communication from another processing device of said group.

* * * * *